United States Patent Office 2,871,029
Patented Jan. 27, 1959

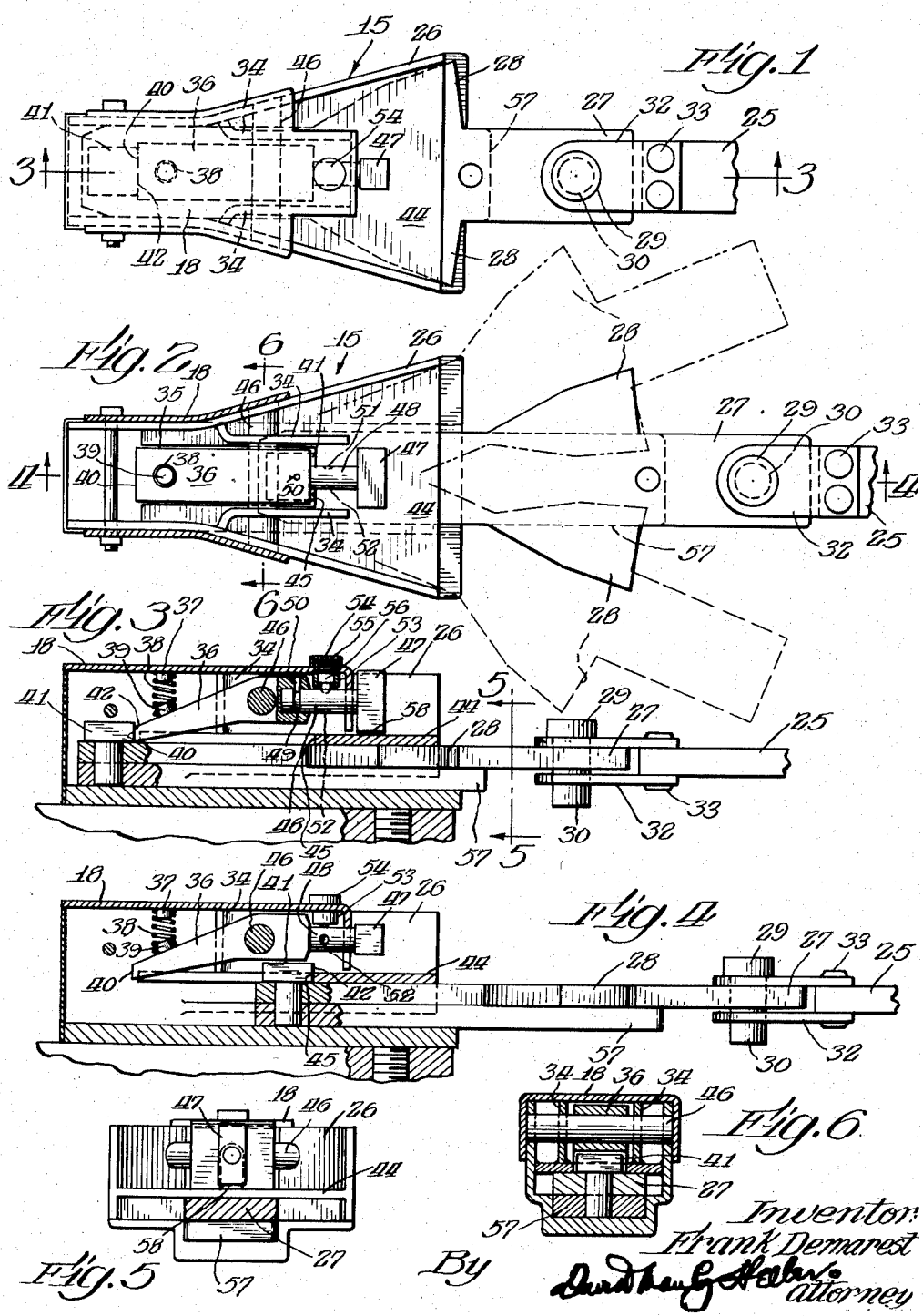

2,871,029

COUPLING FOR TRACTOR AND TRAILER VEHICLES

Frank Demarest, Dixon, Ill.

Application August 27, 1957, Serial No. 680,494

4 Claims. (Cl. 280—477)

My invention relates to couplings for tractors and trailers; the instant application being an improvement over my co-pending patent application designated Serial No. 601,739 and filed August 2, 1956, now Patent No. 2,820,649.

An important object of my invention is to provide a device of the aforementioned character which will facilitate the hitching of tractor vehicles to trailer vehicles.

A still further object of my invention is to provide a device of the aforementioned character which can be manipulated by one hand, of the person hitching the vehicles, permitting said person to release the adjustable slide or tongue, and at the same time release the pawl holding the slide or tongue in retracted position; the other hand being free to align the drawbar with its clevis connection for insertion of the connecting pin or bolt thus completing the hitching of the vehicles.

A still further object of my invention is to provide stop means for locking the pawl means in retracted position and slotted web stop means providing an edge for stopping the slide or tongue when in extended position.

A further object of my invention is to provide a device of the aforementioned character which can be utilized for the purposes for which it is purported to be used, which is simple in construction and economical to manufacture in quantity production.

Other objects, features and advantages resident in my invention will become apparent from an examination of the accompanying drawings, bearing further elucidation in the ensuing description, in which;

Fig. 1 is a top view of my coupling invention.

Fig. 2 is a view similar to Fig. 1 with the cover of the coupling removed showing the interior mechanism thereof, also showing the slide or tongue in extended position.

Fig. 3 is a cross-sectional view taken, substantially, on the lines 3—3 of Fig. 1.

Fig. 4 is a cross-sectional view taken, substantially, on the lines 4—4 of Fig. 2.

Fig. 5 is a transverse cross-sectional view taken, substantially, on the lines 5—5 of Fig. 3.

Fig. 6 is a transverse cross-sectional view taken, substantially, on the lines 6—6 of Fig. 2.

My invention is clearly described, in greater detail, in said co-pending application referred to hereinabove and some of the elements that relate this structure to the structure outlined in said co-pending application have been assigned the same numerical characters.

The invention is generally designated 15 and includes a drawbar 25 pertaining to a trailer vehicle which is to be connected to the coupling instrumentality. The coupling has a flared out case portion 26 for reasons which will become apparent as the description progresses.

The slide or tongue 27 operates slidably within the case and is provided with a saddle suport 57, the same being interconnected by the bolt 41 which secures articuately said saddle 57 and said tongue 27. The slide or tongue 27 is provided with extended wing portions 28 so as to align the same within the flared out portion 26 of the casing when the slide or tongue is in retracted position to locate it firmly therein, and at the same time permitting articulation of the slide or tongue 27 when the same is in extended position in order to facilitate hitching operations between the tractor and the trailer vehicles.

The connection is effectuated by means of a slip pin or bolt having a head 29 and a reduced body 30 so that it will retain the clevis 32 in separable connection with the tongue or slide 27, the clevis articulating at 33 where it is riveted to permit articulation. The differences or special features of my instant invention reside in the provision of two guide flanges 34 interiorly of the casing to provide a support and guideway 35 for the pivot pin 46 on which is mounted the pawl 36. The said pawl has its locking edge 40 in engagement with the edge 42 of the bolt 41 as shown in Fig. 3 when the assembly is in operative position or in retracted position. The pawl is held in locking engagement releasably by virtue of a spring 38 which is anchored on the stub pin 37 on the cover of the casing, and the mating stub pin 39 on the pawl 36. The pawl 36 has secured thereto a manipulating bolt having an elongated head 47 which is of rectangular formation and has an undercut groove 49 for the pin 50 which fits thereinto in order to afford rotation to the bolt 47.

The cover 18 is also equipped with a tube 53 which is partially closed at the bottom in order to confine the plunger 56 which is urged downwardly by the spring 55, the tubing having a screw cap 54 to confine the entire assembly as shown. The body 48 of the bolt is provided with two indentations 51 and 52 which are disposed 90° apart so as to afford stopping points for the rotation of the bolt head 47. When the bolt head 47 is in the position indicated in Fig. 3 the edge 58 being in contact with web 44, it cannot be accidently depressed and cause the pawl 36 to be released, thus permitting the tongue or slide 27 to assume an extended position at such time when the tractor and trailer vehicles are connected. While connecting the vehicles the bolt 47 is rotated to the position indicated in Fig. 2 and Fig. 4 whence it will be noted it may readily be depressed in order to release the pawl 36 from locking engagement with the bolt 41.

The casing is provided with an intermediate web 44 which has a slotted portion terminating in a locking edge 45 so as to afford a stop when the bolt 41 has its locking edge 42 reach that point so as to limit the travel of the slide or tongue 27, and to afford a range of movement for hitching operations in order to facilitate the connection of the vehicles. Thus the bottom 58 of the head of the bolt 47 locks or prevents depression of the bolt when it is substantially in contact with the top surface of the web 44 and when rotated 90° will afford operation of the pawl in order to effectuate the movement hereinbefore mentioned. The connection of the vehicles, namely, the tractor and the trailer is effectuated in the same manner as clearly described in my co-pending patent application with the exception that greater facility is obtained with my present improvement inasmuch as the palm of the hand which grasps the slide or tongue 27 can simultaneously depress the bolt 47 releasing the pawl 36 from engagement and allowing the slide or tongue 27 to be manipulated within the range of its movement so as to not necessitate the precise backing up of a tractor with respect to a trailer which ordinarily would require that the bores in the clevis 32 would have to be in exact alignment with the bore in the slide or tongue 27 permitting the locking bolt 29 to be easily secured thereto.

Although my invention has been herein described in its preferred form, it is to be understood that it is not to be limited to the specific construction herein shown, and that it may be practiced in other forms without departing from the spirit or scope thereof; my invention to be limited only by the subjoined claims.

Having thus described and disclosed my invention, what I claim as novel, and desire to secure by Letters Patent is:

1. A tractor coupling or hitch, comprising a body, a cover secured to said body forming interior confines for the operating mechanism of said tractor coupling, extendable and retractable tongue means mounted within said interior confines, latch locking means mounted on said tongue means, spring-urged latch means articulately mounted within said interior confines and having an edge thereof in locking abutment with said latch locking means, web means positioned within said interior confines provided with edge means to arrest the extendable movement of said tongue means, locking bolt means rotatably secured to one end of said locking latch means and provided with an elongated head for locking said latch means against accidental tripping thereof, and saddle means mounted pivotably to said tongue means and in intimate contact therewith so that substantial areas of their flat surfaces remain in facing contact at all times thus furnishing rigid support to said tongue means when in extended position.

2. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means articulately mounted within said interior confines and having an edge thereof in locking abutment with said latch locking means, web means positioned within said interior confines provided with edge means to arrest the extendable movement of said tongue means, locking bolt means rotatably secured to one end of said locking latch means and provided with an elongated head for locking said latch means against accidental tripping thereof, and saddle means mounted pivotally to said tongue means and in intimate contact therewith so that substantial areas of their flat surfaces remain in facing contact at all times thus furnishing rigid support to said tongue means when in extended position.

3. A tractor coupling or hitch, comprising a body, a cover secured to said body forming interior confines for the operating mechanism of said tractor coupling, extendable and retractable tongue means mounted within said interior confines, latch locking means mounted on said tongue means, spring-urged latch means articulately mounted within said interior confines and having an edge thereof in locking abutment with said latch locking means, web means positioned within said interior confines provided with edge means to arrest the extendable movement of said tongue means, locking bolt means rotatably secured to one end of said locking latch means and provided with an elongated head for locking said latch means against accidental tripping thereof, and saddle means mounted pivotably to said tongue means and in intimate contact therewith so that substantial areas of their flat surfaces remain in facing contact at all times thus furnishing rigid support to said tongue means when in extended position, and bolt and nut means for securing said body and said cover in assembly.

4. A tractor coupling or hitch, comprising a body, a cover secured to said body forming interior confines for the operating mechanism of said tractor coupling, extendable and retractable and radially adjustable tongue means mounted within said interior confines, latch locking means mounted on said tongue means, spring-urged latch means articulately mounted within said interior confines and having an edge thereof in locking abutment with said latch locking means, web means positioned within said interior confines provided with edge means to arrest the extendable movement of said tongue means, locking bolt means rotatably secured to one end of said locking latch means and provided with an elongated head for locking said latch means against accidental tripping thereof, and saddle means mounted pivotably to said tongue means and in intimate contact therewith so that substantial areas of their flat surfaces remain in facing contact at all times thus furnishing rigid support to said tongue means when in extended position, and bolt and nut means for securing said body and said cover in assembly.

References Cited in the file of this patent

UNITED STATES PATENTS

| 2,717,163 | Martin | Sept. 6, 1955 |

FOREIGN PATENTS

| 488,970 | Germany | Jan. 11, 1930 |
| 586,883 | Great Britain | Apr. 3, 1947 |